(12) United States Patent
Johnson

(10) Patent No.: US 9,988,258 B2
(45) Date of Patent: Jun. 5, 2018

(54) TUBE FITMENT FOR USE WITH A VALVE FITMENT FOR DISPENSING FLUIDS

(71) Applicant: LIQUI-BOX CORPORATION, Worthington, OH (US)

(72) Inventor: James W. Johnson, Delaware, OH (US)

(73) Assignee: LIQUI-BOX CORPORATION, Richmond, VA (US)

( * ) Notice: Subject to any disclaimer, the term of this patent is extended or adjusted under 35 U.S.C. 154(b) by 859 days.

(21) Appl. No.: 13/873,648

(22) Filed: Apr. 30, 2013

(65) Prior Publication Data

US 2013/0285364 A1    Oct. 31, 2013

Related U.S. Application Data

(60) Provisional application No. 61/640,369, filed on Apr. 30, 2012.

(51) Int. Cl.
*B67D 7/00*    (2010.01)
*F16L 41/02*   (2006.01)
*B67D 3/00*    (2006.01)
*B67D 3/04*    (2006.01)

(52) U.S. Cl.
CPC .............. *B67D 7/005* (2013.01); *B67D 3/00* (2013.01); *F16L 41/021* (2013.01); *B67D 3/043* (2013.01)

(58) Field of Classification Search
CPC . B67D 7/005; B67D 3/00; B67D 3/04; B67D 3/043; F16L 41/021

USPC ..... 285/133.11, 133.21, 133.4, 133.5, 133.6, 285/239, 241, 242; 222/95, 96
See application file for complete search history.

(56) References Cited

U.S. PATENT DOCUMENTS

| | | | |
|---|---|---|---|
| 4,337,806 A * | 7/1982 | Cirella | B67D 3/00 141/100 |
| 4,380,310 A | 4/1983 | Schneiter et al. | |
| 4,421,146 A * | 12/1983 | Bond | B65D 77/06 141/349 |
| 4,948,014 A | 8/1990 | Rutter et al. | |
| 5,095,962 A * | 3/1992 | Lloyd-Davies | B67D 3/045 141/114 |
| 5,351,860 A | 10/1994 | Gotoh | |

(Continued)

FOREIGN PATENT DOCUMENTS

DE    9105421 U1    8/1991
EP    0272906 A2    6/1988
(Continued)

*Primary Examiner* — Gregory J Binda
*Assistant Examiner* — Zachary T Dragicevich
(74) *Attorney, Agent, or Firm* — Baker & Hostetler LLP

(57) ABSTRACT

Provided is a tube fitment used in a fitment valve assembly having a vertical cylindrical housing and a horizontal cylindrical channel connected to each other in a T-shape, the vertical housing having a top section, a middle section, and a lower section, the top section of the housing having a front wall and a partially open back wall, where the opening is the locus for connecting a spout valve assembly; the horizontal cylindrical channel having a first opening at the first end proximate to the joint of the T-shaped tube fitment and at the top of the horizontal cylindrical channel; having an activator pin and an O-ring situated in the second section of the vertical cylindrical housing that is narrower that said first section of said vertical cylindrical housing.

8 Claims, 18 Drawing Sheets

(56) References Cited

U.S. PATENT DOCUMENTS

| | | | |
|---|---|---|---|
| 5,765,612 A | 6/1998 | Morin | |
| 5,775,364 A * | 7/1998 | Erb | B67D 3/043 |
| | | | 137/322 |
| 5,884,648 A | 3/1999 | Savage | |
| 6,953,070 B1 * | 10/2005 | Labinski | B67D 3/02 |
| | | | 137/614.03 |
| 2004/0256424 A1 * | 12/2004 | Johnson | B65D 77/067 |
| | | | 222/518 |
| 2008/0053568 A1 * | 3/2008 | Johnson | B67D 1/0082 |
| | | | 141/383 |
| 2010/0260892 A1 | 10/2010 | Reddy | |
| 2011/0083764 A1 * | 4/2011 | Hart | B67D 3/00 |
| | | | 137/801 |

FOREIGN PATENT DOCUMENTS

| | | |
|---|---|---|
| EP | 0512284 A2 | 11/1992 |
| EP | 1627850 A1 | 2/2006 |
| FR | 2303730 A1 | 10/1976 |
| WO | WO 83/01605 A1 | 5/1983 |

* cited by examiner

TUBE FITMENT FOR USE WITH A VALVE FITMENT FOR DISPENSING FLUIDS

FIELD OF INVENTION

This invention relates to a tube fitment that is used with a valve fitment assembly used to dispense fluids or flowable materials from a container. The tube fitment is utilized in conjunction with the valve fitment assembly to allow the fitment assembly to be used with a spout and valve assembly attached to a container holding fluid.

BACKGROUND

For example, a valve fitment assembly may be used to dispense liquid from a collapsible bag or container. However, this fitment assembly can only be used in conjunction with a certain design of spout and valve assembly that is attached to the container. Containers having a different spout and valve assembly design cannot be used with this valve fitment assembly.

The tube fitment of this invention allows for the use of such a valve fitment to be used with other spout and valve assemblies attached to a fluid container.

SUMMARY OF INVENTION

In one embodiment, this invention relates to a tube fitment used in a fitment valve assembly comprising:
(I) a vertical cylindrical housing, and
(II) a horizontal cylindrical channel;
wherein said vertical cylindrical housing comprises a top section, a middle section, and a lower section;
wherein said vertical cylindrical housing and said horizontal cylindrical channel are connected to each other in a T-shape;
wherein said top section of said vertical cylindrical housing comprises a front wall, and is partially open at the back wall, wherein said opening is the locus for connecting a spout-valve assembly attached to a container that dispenses fluid;
wherein said horizontal cylindrical channel comprises at least a first opening;
wherein said first opening is at the first end proximate to the joint of said T-shaped tube fitment, and at the top of said horizontal cylindrical channel such that said first opening opens at the bottom of said first section of said vertical cylindrical housing and at the top of said second section of said vertical cylindrical housing;
wherein at the base of said third section said vertical cylindrical housing directly below said first opening in said horizontal cylindrical channel comprises an activator pin;
wherein at the top of said first opening proximate to the bottom of said first section said vertical cylindrical housing is an O-ring for sealing attachment with said spout-valve assembly;
wherein said O-ring is situated in said second section of said vertical cylindrical housing that is narrower that said first section of said vertical cylindrical housing.

In one embodiment, this invention relates to the tube fitment as recited above, wherein said front wall, on the inside, comprises a locking groove for locking said tube fitment to said spout-valve assembly.

In one embodiment, this invention relates to the tube fitment as recited above, wherein said front wall, on the inside, also comprises a locking hole above said locking groove for locking said tube fitment to said spout-valve assembly through a twist knob movable between the in and out position through said locking hole.

In another embodiment, this invention relates to the tube fitment as recited above, wherein said top section of said vertical cylindrical housing comprises two optionally J-shaped pull-tabs attached to the two sides of said front wall, such that said vertical cylindrical housing's side walls protrude over the base of said J-shaped pull-tabs.

In yet another embodiment, this invention relates to the tube fitment as recited above, wherein attached to the opening at the back wall of said vertical cylindrical housing is an U-shaped tray that supports said spout-valve assembly attached to the fluid dispensing container.

In another embodiment, this invention relates to the tube fitment as recited above, wherein said tray is U-shaped.

In another embodiment, this invention relates to the tube fitment as recited above, wherein said activator pin is supported by at least one ridge.

In yet another embodiment, this invention relates to the tube fitment as recited above, wherein said at least one ridge is rectangular.

In another embodiment, this invention relates to the tube fitment as recited above, wherein said activator pin is cylindrical.

DETAILED DESCRIPTION OF THE INVENTION

Figure 1:
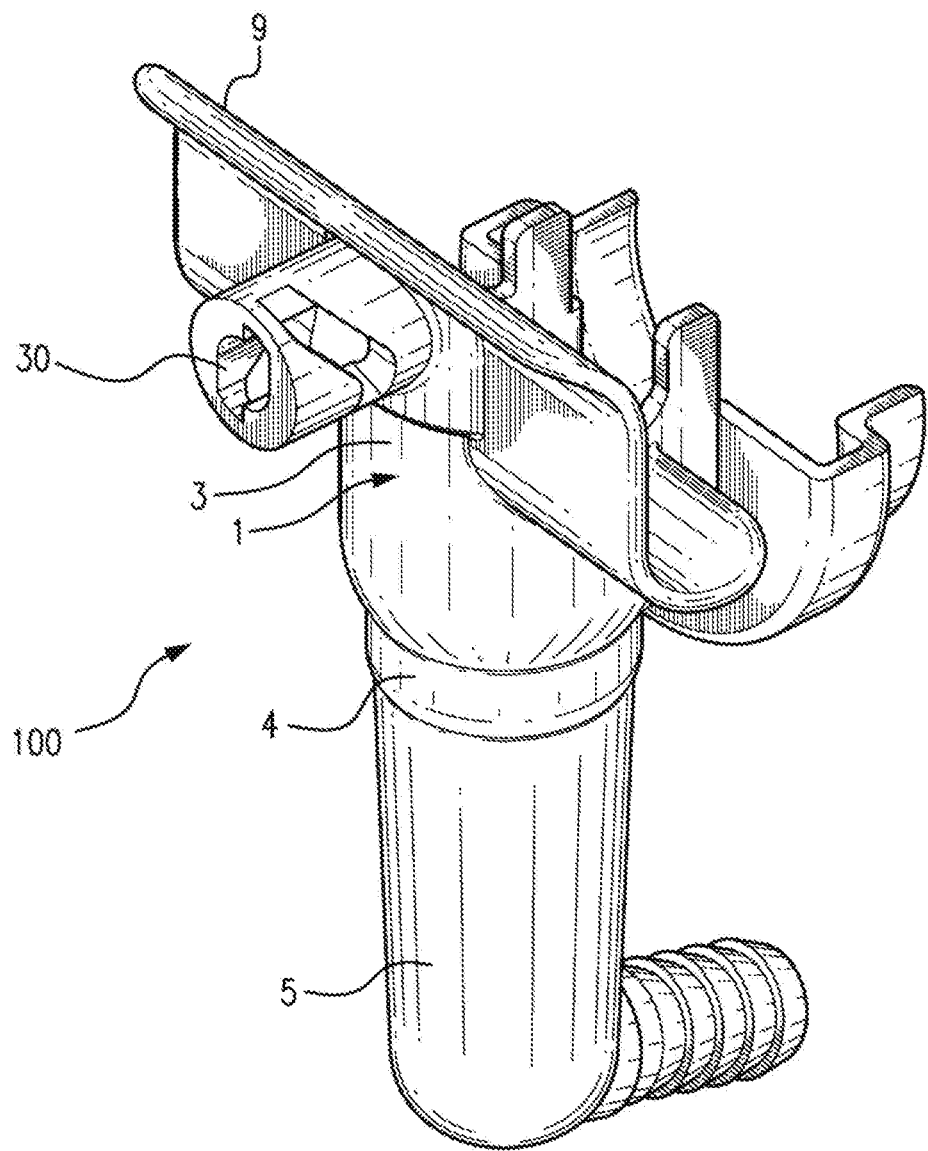
FIG. 1 is a line diagram of the perspective view of the tube fitment in the front view.
Figure 2:
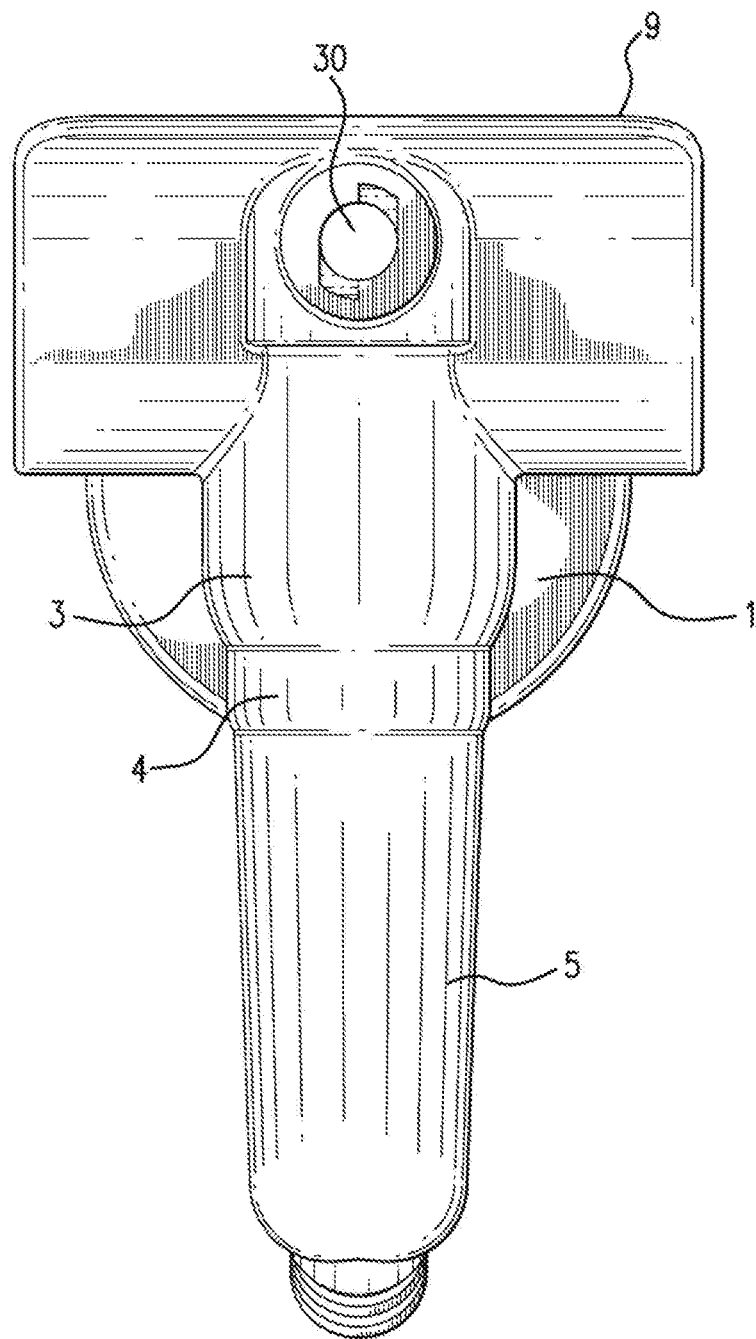
FIG. 2 is a line diagram of the front view of the tube fitment.
Figure 3:
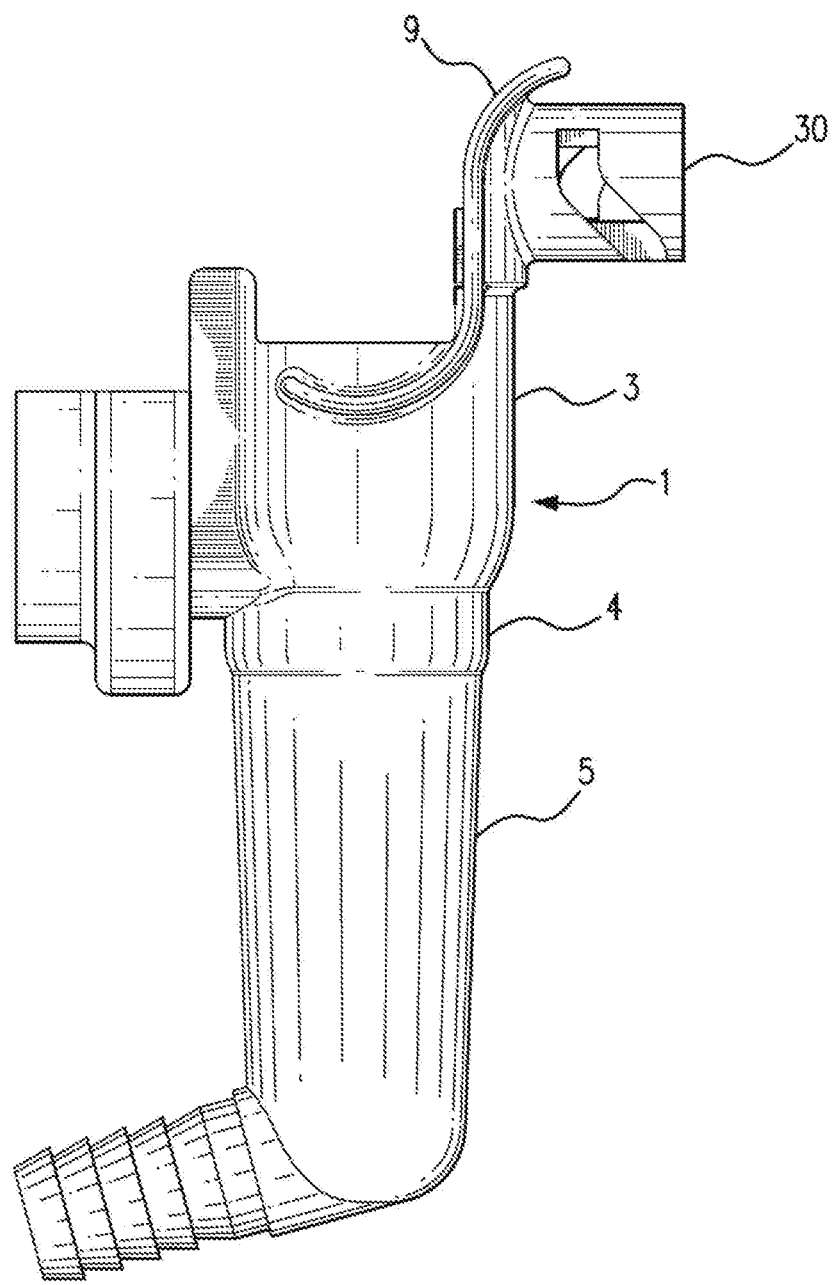
FIG. 3 is a line diagram of the left side view of the tube fitment.

Ranges are used herein in shorthand, so as to avoid having to list and describe each and every value within the range. Any appropriate value within the range can be selected as the upper value, lower value, or the terminus of the range.

As used herein, the singular form of a word includes the plural, and vice versa, unless the context clearly dictates otherwise. Thus, the references "a," "an," and "the" are generally inclusive of the plurals of the respective terms. For example, reference to "a method" includes a plurality of such "methods." Likewise, the terms "include," "including," and "or" should all be construed to be inclusive, unless such a construction is clearly prohibited from the context. Similarly, the term "examples," particularly when followed by a listing of terms, is merely exemplary or illustrative and should not be deemed to be exclusive or comprehensive.

The term "comprising" is intended to include embodiments encompassed by the terms "consisting essentially of" and "consisting of." Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

As used herein, the term "flowable material" encompasses materials that are flowable under gravity or may be pumped. Such materials include liquids, for example, milk, water, fruit juice, oil; emulsions, for example, ice cream mix, soft margarine; pastes, for example, meat pastes, peanut butter; preserves, for example, jams, pie fillings, marmalade; jellies; doughs; ground meat, for example, sausage meat; powders, for example, gelatin powders, detergents; granular solids, for example, nuts, sugar; and like materials. The invention described herein is particularly useful for flowable foods such as wine or milk.

A view from the top, and bottom, a perspective view from the front and a perspective view from the back are shown for the tube fitment-spout combination of the present invention in FIGS. 1 6, 7, and 8, respectively. The tube fitment comprises of a vertically oriented housing 1, that comprises of (1) a top section or the first cylindrical section 3; (2) a middle section or the second cylindrical section 4; and (3) a lower section or the third cylindrical section 5. The cylindrical sections are preferably of a tapered shape. Extending from the top section 3 to its back side, is a horizontal channel 2. The vertical housing 1 has a top end, middle end, and the lower end. The top end is partially open to the outside, towards its back side, forming the horizontal channel 2. FIGS. 2, 3, 4 and 5 show the front view, left side view, back view and right side view, respectively.

Figure 8:
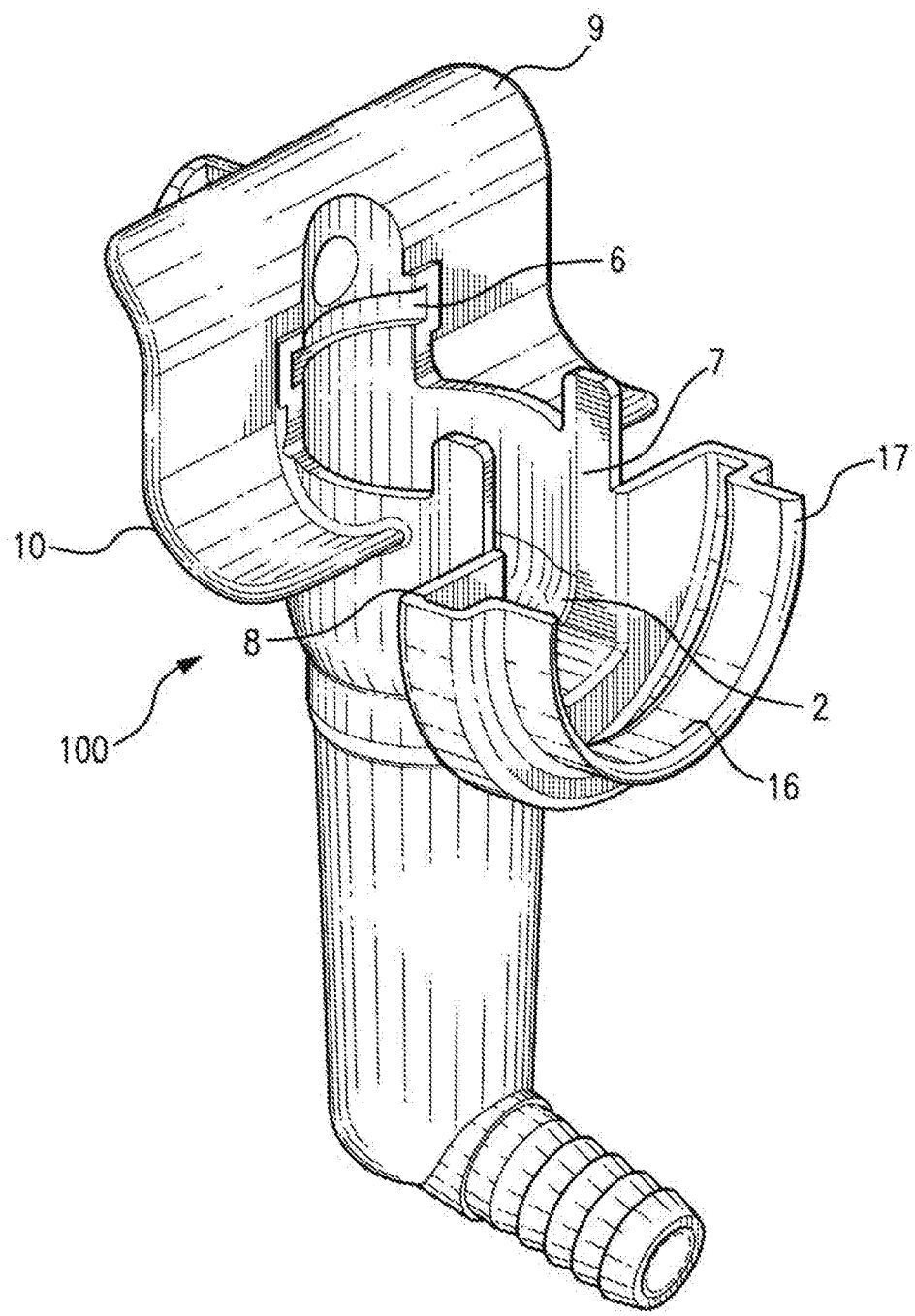
FIG. 8 is a line diagram of the perspective view of the tube fitment in the back view.
Figure 12:
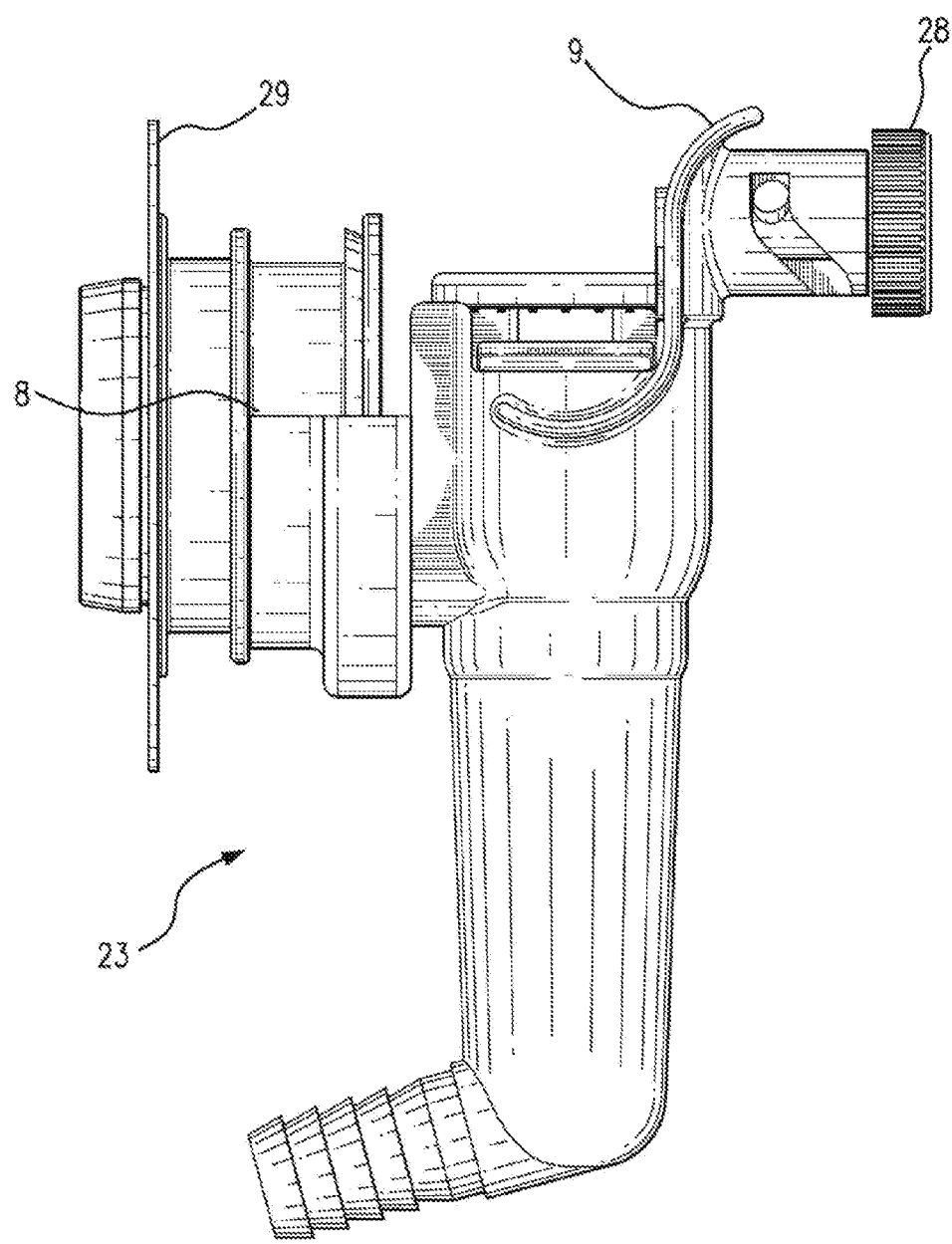
FIG. 12 is a line diagram of the left side view of the tube fitment attached to the spout and valve dispensing system with the locking twist knob inserted in the tube fitment.
Figure 13:
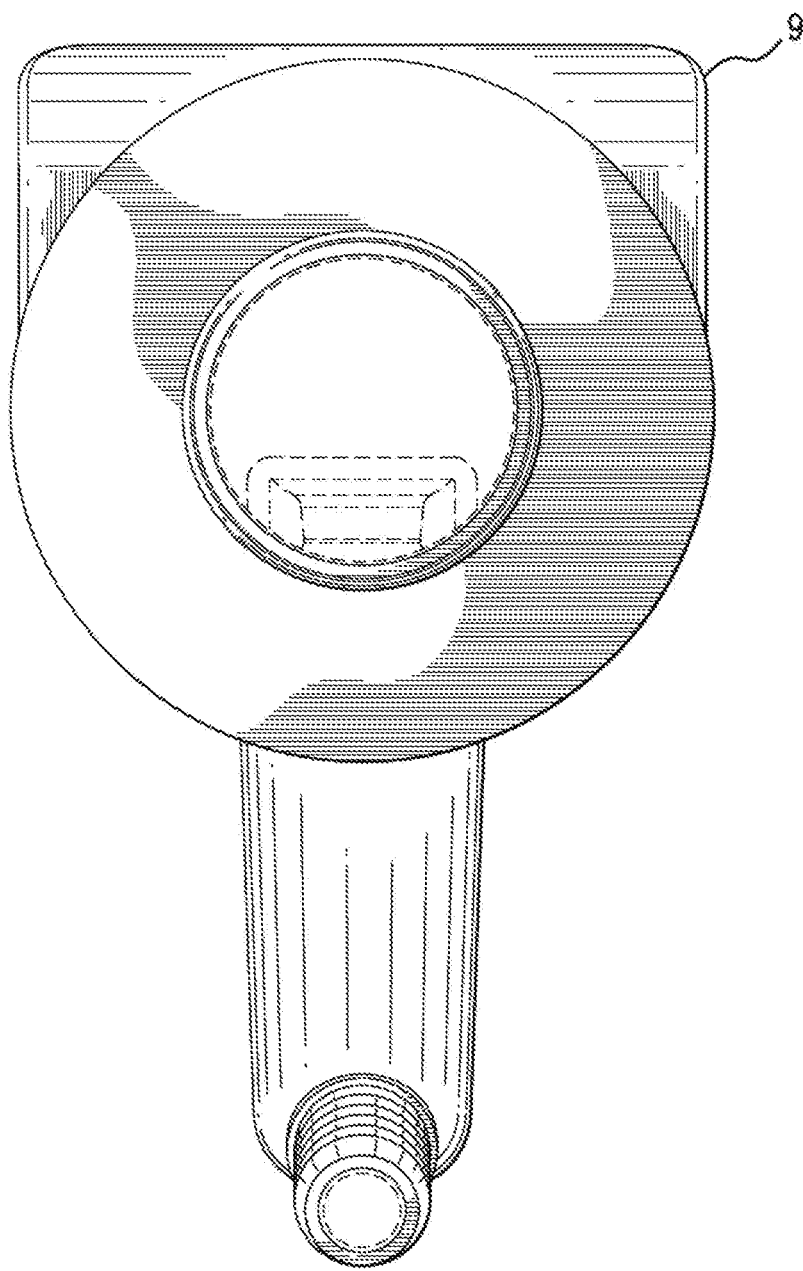
FIG. 13 is a line diagram of the bottom side view of the tube fitment attached to the spout and valve dispensing system with the locking twist knob inserted in the tube fitment.
Figure 14:
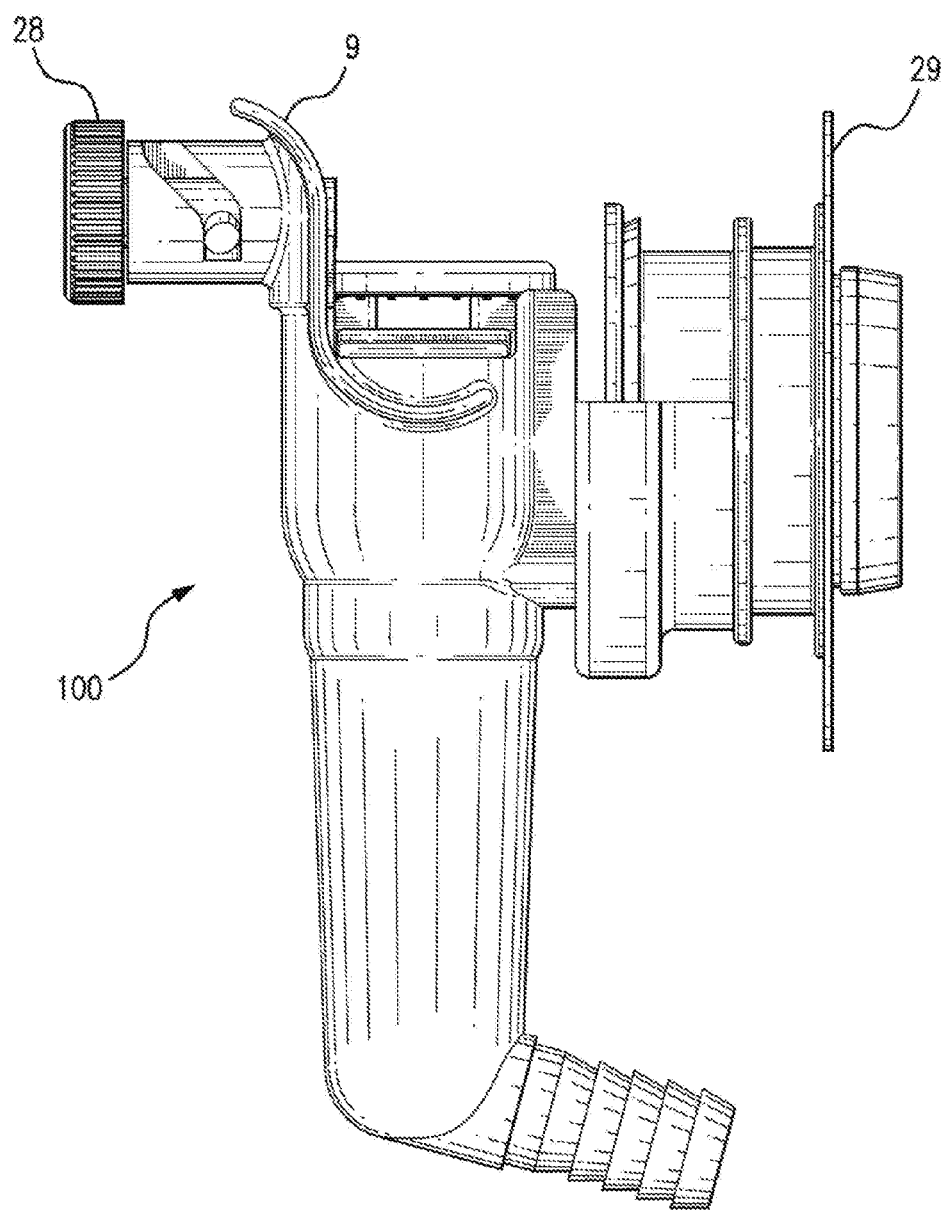
FIG. 14 is a line diagram of the right side view of the tube fitment attached to the spout and valve dispensing system with the locking twist knob inserted in the tube fitment.
Figure 15:
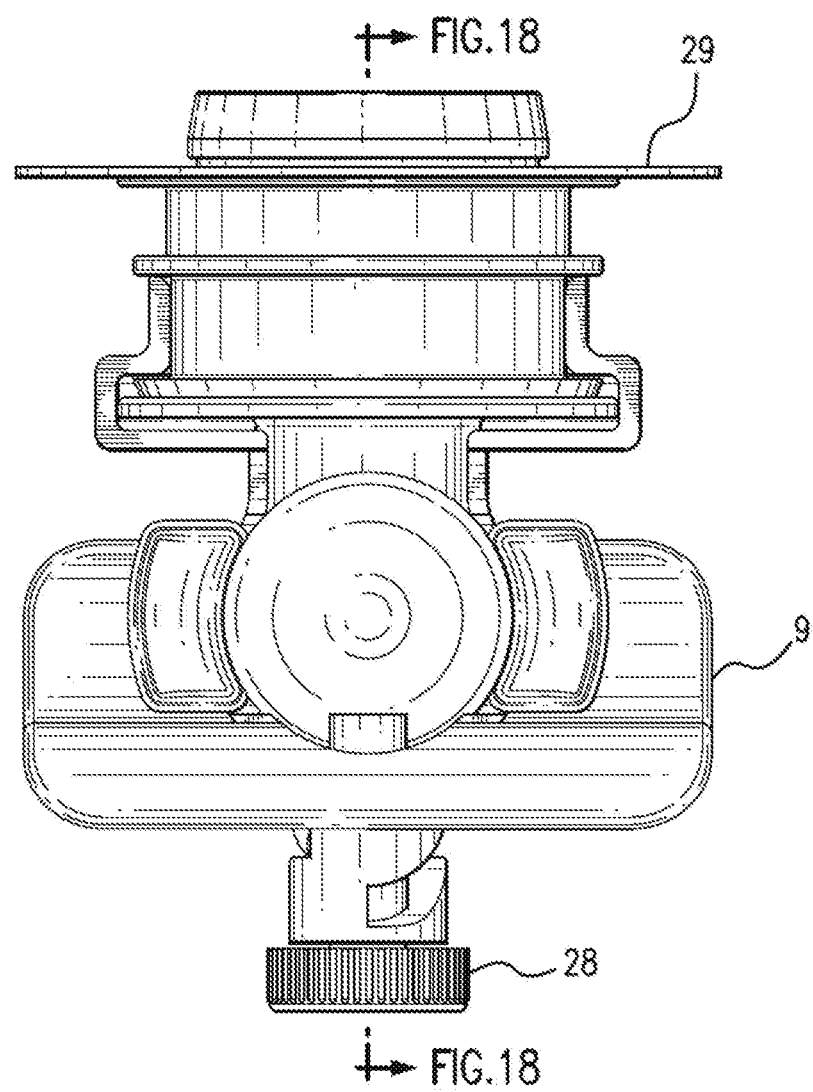
FIG. 15 is a line diagram of the back view of the tube fitment attached to the spout and valve dispensing system with the locking twist knob inserted in the tube fitment.
Figure 16:
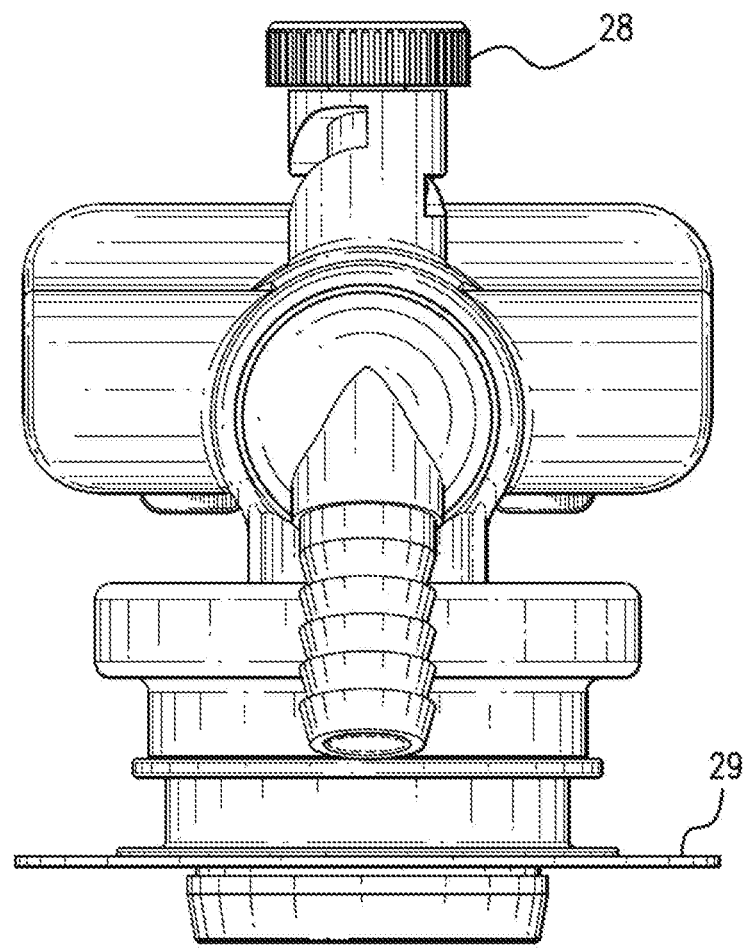
FIG. 16 is a line diagram of the bottom view of the tube fitment attached to the spout and valve dispensing system with the locking twist knob inserted in the tube fitment.
Figure 17:
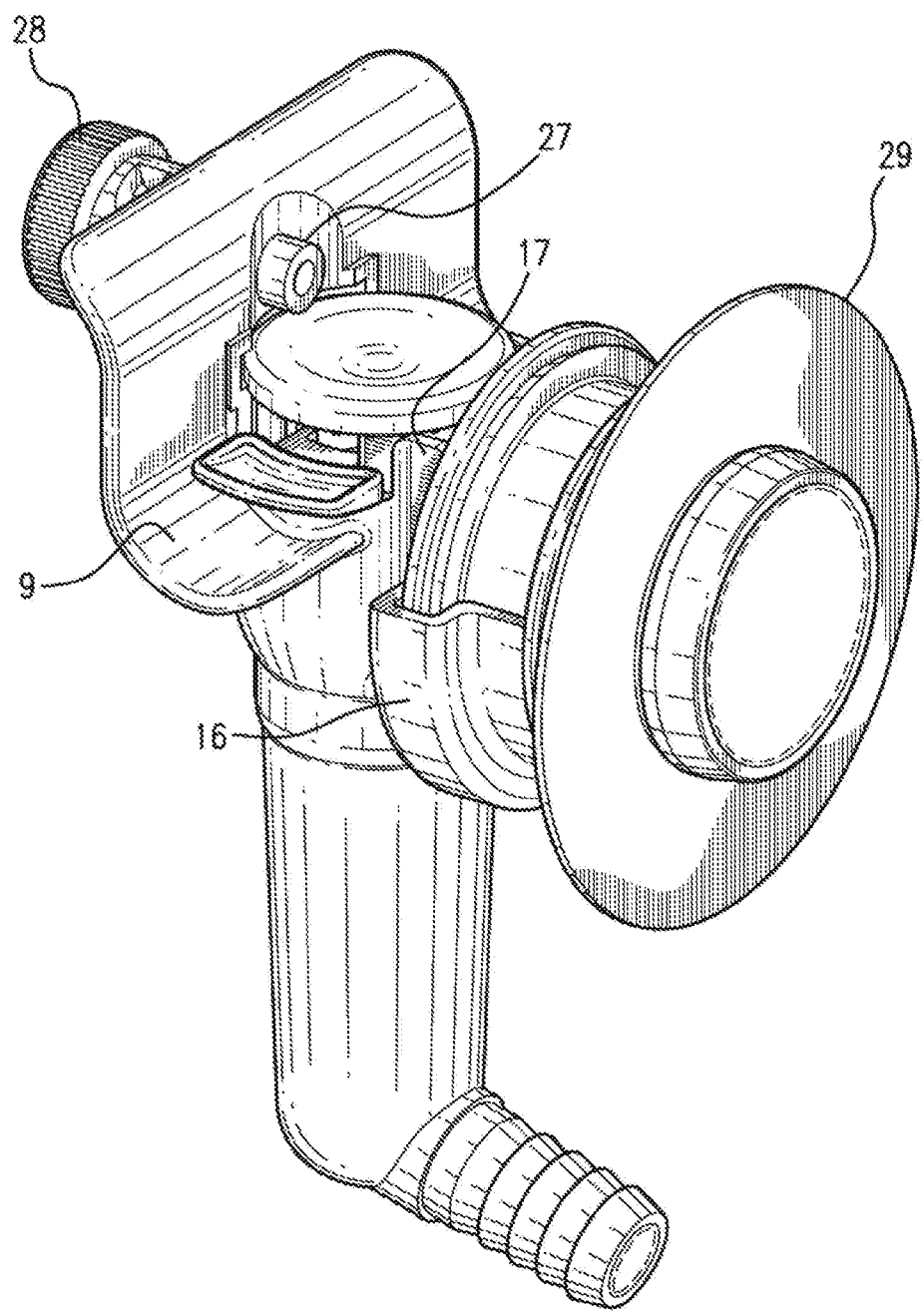
FIG. 17 is a line diagram of the perspective view from the back of the tube fitment attached to the spout and valve dispensing system with the locking twist knob inserted in the tube fitment.

In one embodiment, the tube fitment is a single piece of plastic. The vertical housing 1 is generally cylindrical, with an opening on its back side 7, that is, the top end of the vertical cylinder is only partially complete (FIGS. 1 and 8). As a matter of fact, in one embodiment, the back side 7 of the vertical housing 1 is open such that only about two-thirds of the top end of the cylinder 10 is closed, and which displays a cut-away section, The open portion of the top end of the vertical cylindrical housing 1 on its back side 7 is used to connect the tube fitment to a spout 29 and a valve assembly attached to a fluid container 8 (FIG. 12). Attached to the top of the vertical cylindrical housing 1 on either side of the top end of the open cylinder on the outside of the cylinder are two, optionally J-shaped (optionally, nominally S-shaped), pull tabs 9 that are used to detach the tube fitment from the spout 29 and valve assembly attached to the fluid container. The partial cylindrical portion that extends above the J-shaped pull tabs 9 is designed dimensionally such that attachment of the tube fitment to the spout 29 and valve assembly of the fluid container helps activate the spout 29 and valve, to open the fluid container and initiate the flow of the fluid out of the container.

Figure 10:
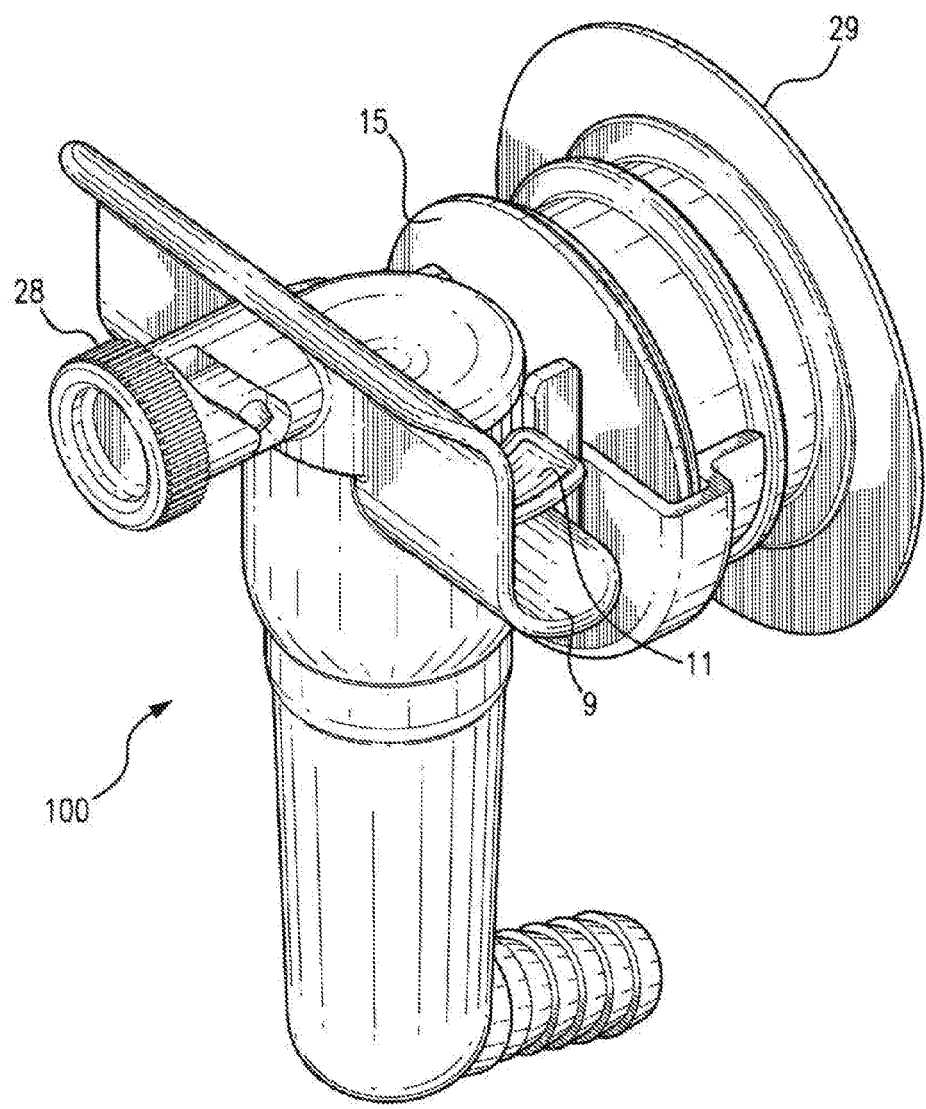
FIG. 10 is a line diagram of the perspective view of the tube fitment attached to the spout and valve dispensing system with the locking twist knob inserted in the tube fitment.
Figure 11:
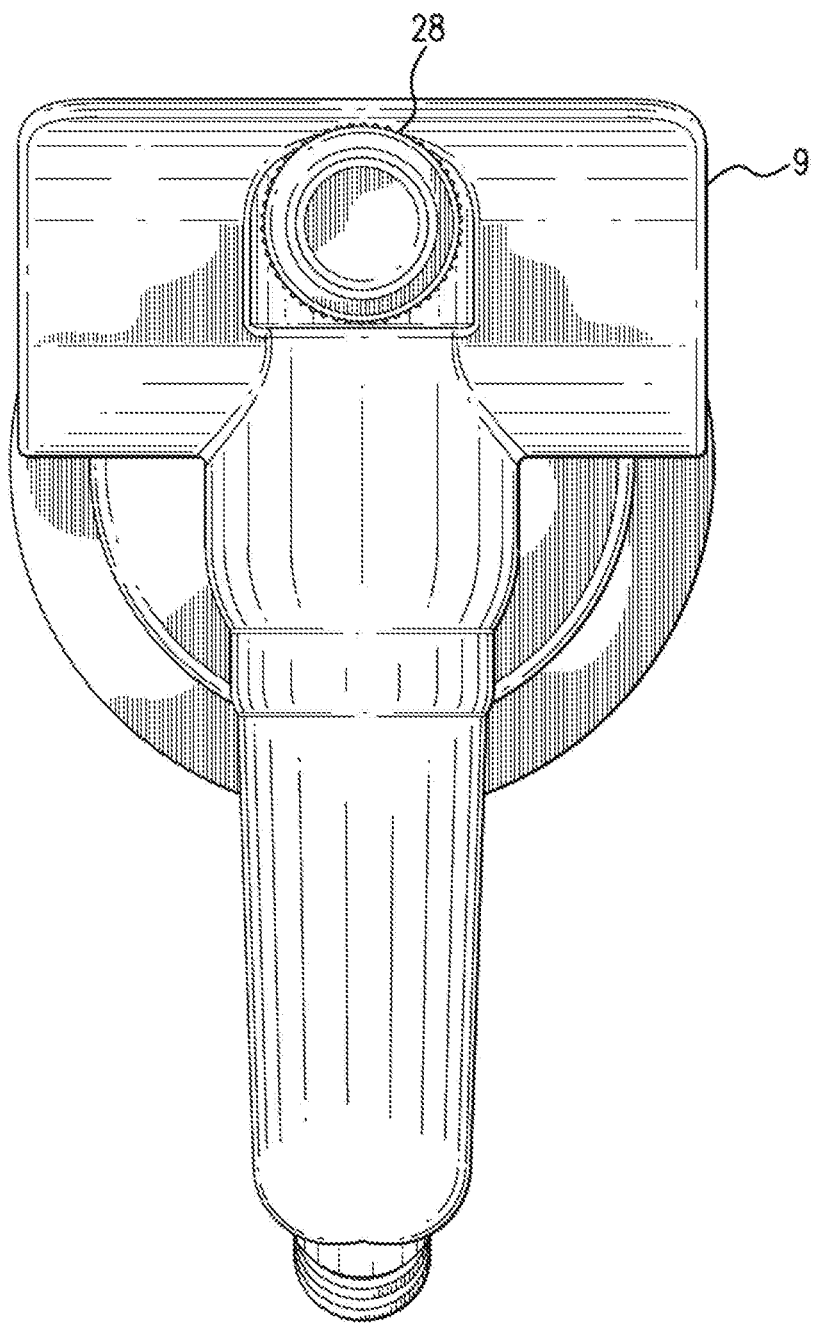
FIG. 11 is a line diagram of the front view of the tube fitment attached to the spout and valve dispensing system with the locking twist knob inserted in the tube fitment.

When the tube fitment 100 is attached to the spout 29 and the valve assembly (FIG. 10), the partial vertical cylindrical housing 1 extending beyond the J-shaped pull tabs 9 activates at least one, and preferably two optionally horizontal wings 11 attached to the spout 29 and valve assembly, by moving them vertically upward. This vertically upward movement opens the valve within the spout 29 and valve assembly thereby rendering the flow movement out to the middle to lower end of the vertical cylindrical housing 1. The activation is also aided by an optional seal activator pin 12 described below. The vertical cylindrical housing wall at its top end extends as high as the top portion of the J-shaped pull tabs 9, and in some instances, even higher. In some instances, it is below the J-shaped pull tabs 9. (See also, FIGS. 11-17.)

Figure 4:
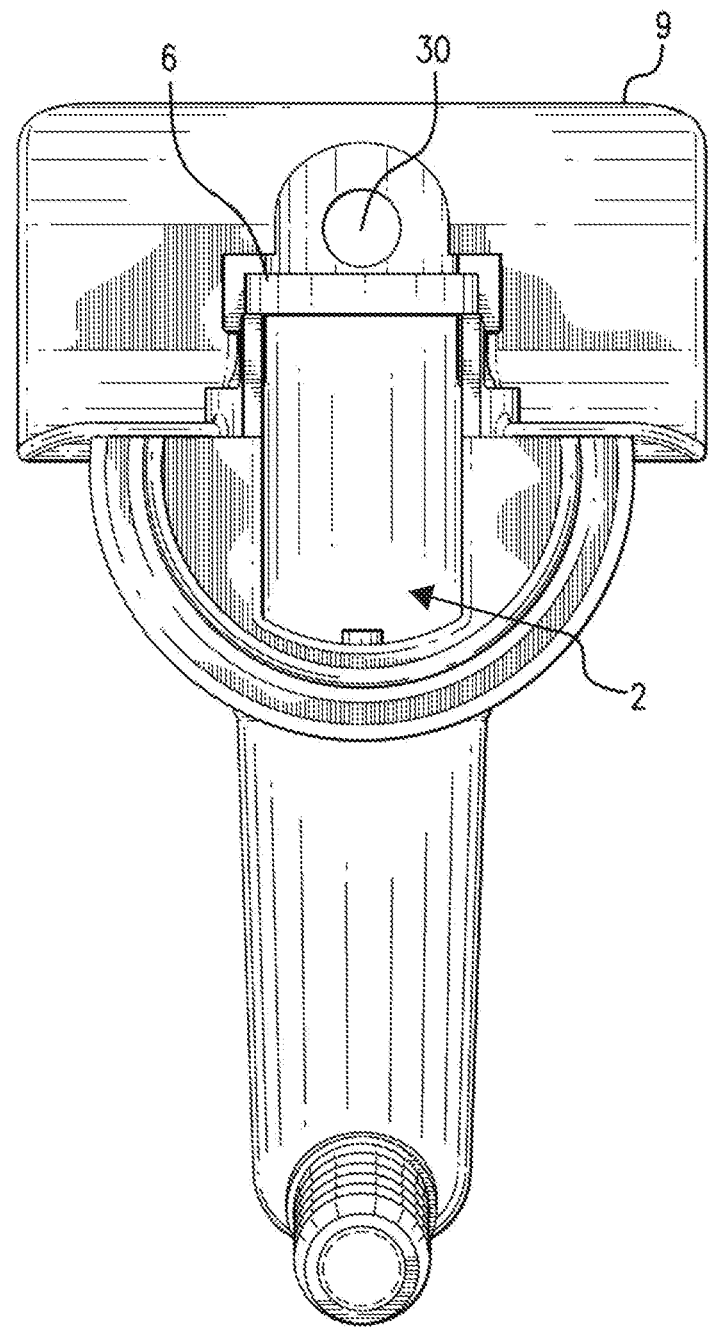
FIG. 4 is a line diagram of the back view of the tube fitment.
Figure 5:
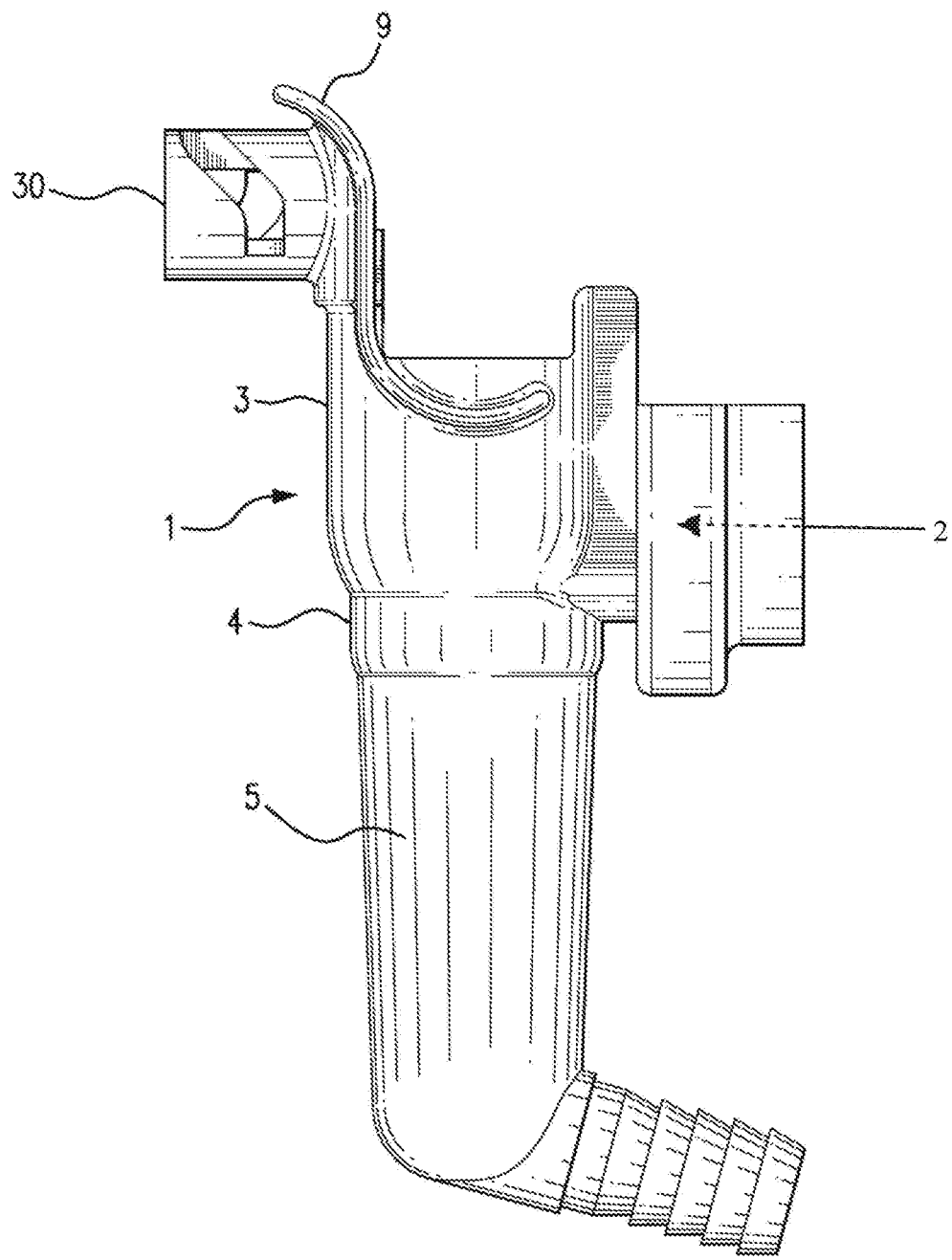
FIG. 5 is a line diagram of the right side view of the tube fitment.
Figure 6:
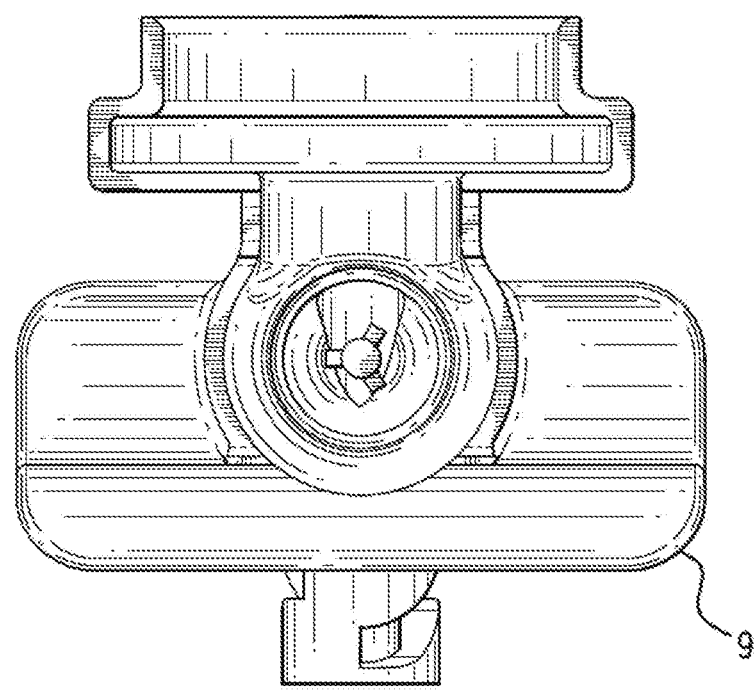
FIG. 6 is a line diagram of the top view of the tube fitment.
Figure 7:
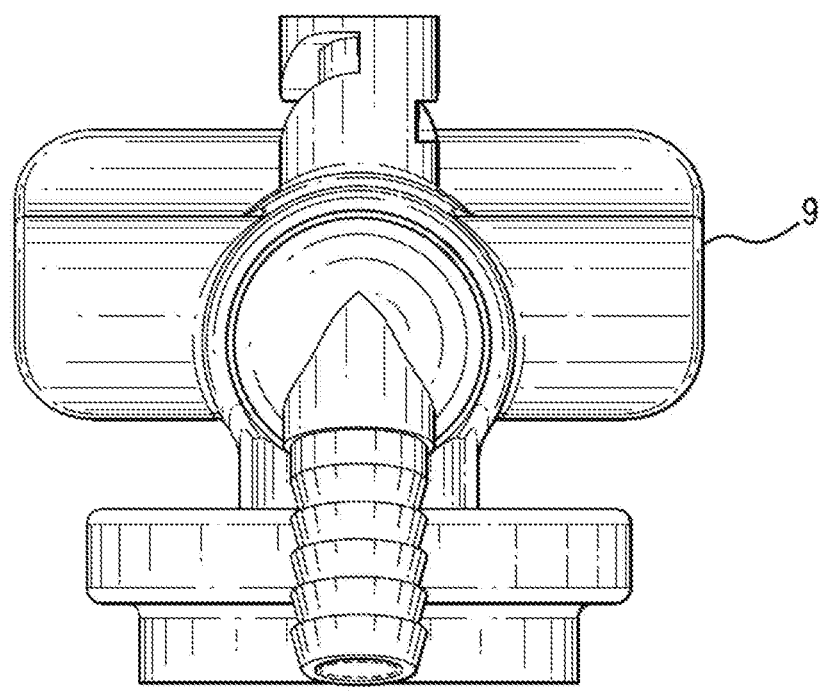
FIG. 7 is a line diagram of the bottom view of the tube fitment.

In the extended portion of the cylindrical wall, at the top, on the inside, and in between the J-shaped pull tabs 9 is a locking groove 6 or an indentation channel that goes within the depth of the vertical cylindrical housing's extended portion. The locking groove 6 locks the tube fitment to the top ridge 15 of the spout 29 and valve assembly attached to the fluid container (FIGS. 4 and 8). In the extended portion of the cylindrical wall, at the top, on the inside, above the locking groove 6, and in between the J-shaped pull tabs 9 is an indentation that goes within the depth of the vertical cylindrical housing's extended portion. The indentation is the locus for inserting a locking peg or pin 27, that is inserted by a twist knob 28 at the other end of the pin, residing on the outside of the J-shaped pull tabs 9. The twist knob's rotary action moves the locking pin 27 positioned in locking hole 30 towards the inside of the J-shaped pull tabs 9. In one embodiment, when the tubing fitment is attached to the spout 29 and valve assembly attached to the fluid container, the twist knob 28 is inserted inward so that the locking pin 27 sits above the top of the upper ridge of the spout and valve assembly. This position of the locking pin 27 ensures that the tube fitment is not detached from the spout 29 and valve assembly, accidentally or otherwise. The locking pin 27 can be snugly fit over the top ridge of the spout 29 and valve assembly, or, in an alternative embodiment, a gap exists between the locking pin 27 and the top ridge of the spout and valve assembly.

The locking pin 27 (FIG. 17) locks the tube fitment to the top ridge of the spout 29 and valve assembly attached to the fluid container. When the tube fitment is locked with the spout 29 and valve assembly, the spout and valve assembly fits snugly within the partially open vertical cylindrical housing 1. A bottom tray 16 attached to the bottom portion of the open vertical cylindrical housing 1 helps in snugly fitting the spout 29 and valve assembly to the tube fitment. The preferably U-shaped bottom tray 16 with two vertical walls is attached (in the embodiment that is a monolithic tube fitment) to the partial cylindrical wall of the vertical housing 1 and forms the protrusion beyond the partial cylindrical wall and appears in a U-shape when viewed in the back view (FIG. 4) of the tube fitment 100.

Figure 9:
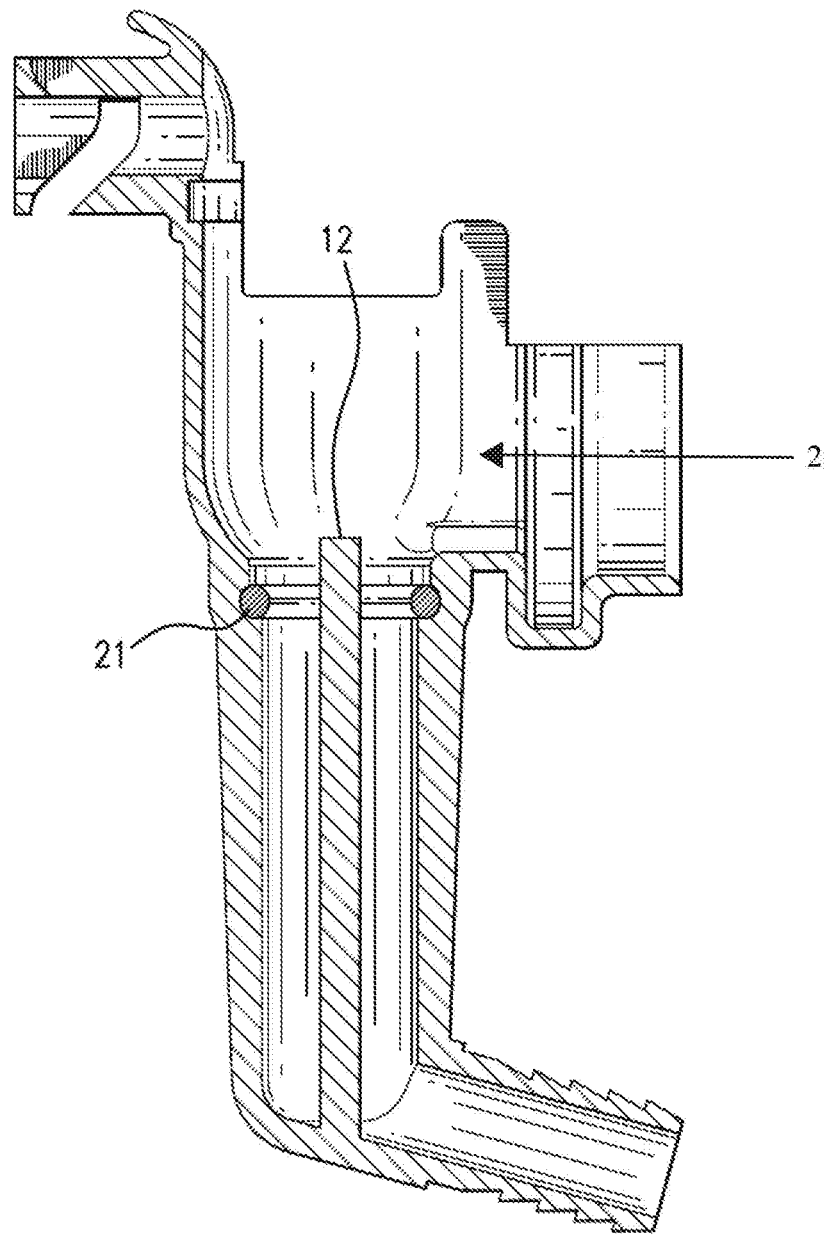
FIG. 9 is a line diagram of the cross-sectional view of the tube fitment in the side view.

The vertical cylindrical housing 1 of the tube fitment, in a preferred embodiment, can taper into a second cylindrical section 4, a middle section, located at the joint of the two legs of the L-shaped tube fitment (a preferred embodiment is a monolithic structure without a joint). The second cylindrical section 4, which is smaller than the vertical cylindrical housing 1 in diameter, houses a snugly fit O-ring 21 (FIG. 9) or other device that also helps secure the tube fitment to the valve and spout fitment on the dispensing container. The O-ring 21 provides the seal between the horizontal cylindrical channel 2 of the tube fitment and the spout 29 of the valve and spout assembly, such that, when the valve is opened as a result of the activator action, the fluid flows out the horizontal cylindrical channel 2 and down for dispensation.

Figure 18:
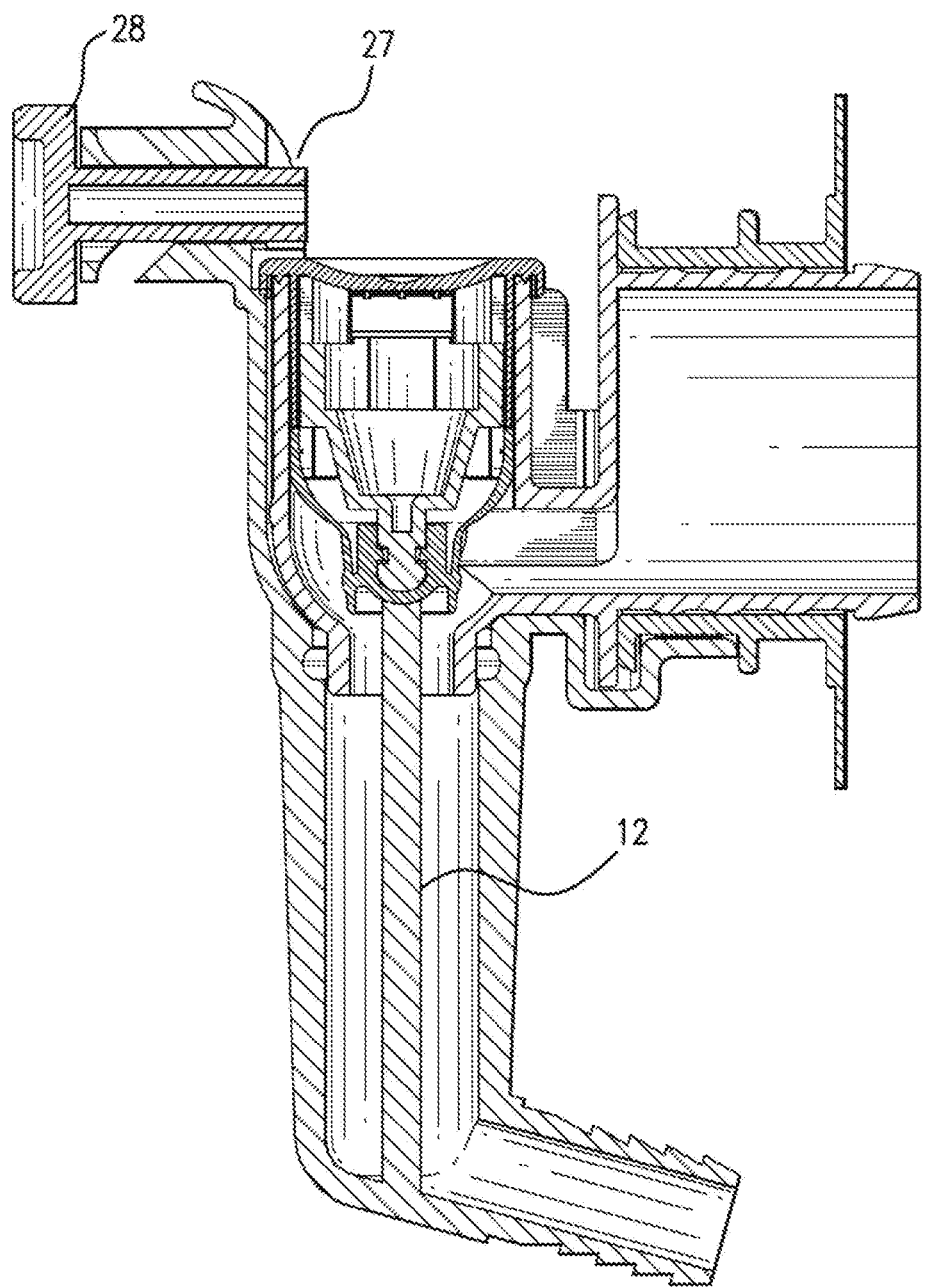
FIG. 18 is a line diagram of the cross-sectional view of the tube fitment attached to the spout and valve dispensing system with the locking twist knob inserted in the tube fitment, in the side view.

The second cylindrical section, or the middle section (4), extends into an optionally tapered third section, or the lower section (5). At the bottom, and on the inside of the third section (5), is provided an optional cylindrical shaped pin 12 also known as seal activator pin 12 (FIG. 9), which acts as an activator to commence fluid dispensation. The cylindrical pin 12 extends upwards, from the base of the lower section (5) up to the middle section (4), where, its tip helps activate the valve of the spout and valve assembly. The force of action of attachment of the tube fitment to the valve and spout assembly pushes the pin (12) upwards, into the spout (29), and activates the spout by opening the seal inside the spout (FIG. 18). This activation is in conjunction with the lifting of the two horizontal wings on the spout and valve assembly, which also aid in activation and fluid flow as the wings are internally mechanically attached to facilitate the opening of the seal. The cylindrical pin (12) located at the bottom of the horizontal cylinder's first end is optionally supported by ridges, that in preferred embodiments are one or more triangular vertical ridges attached to the cylindrical pin (12). The ridges, triangular or otherwise, help against the bending of the cylindrical pin (12) upon exertion of pressure on the pin for activation purposes. In one embodiment, the ridges or ribs are rectangular and perpendicular to the surface of the cylindrical pin (12) and in a radial orientation, extending from the base of the pin to its tip.

Once the pin (12) activates the valve, fluid flows from the spout 29, through the valve, an external to the pin, in the flow channels. The flowing fluid is taken for dispensation by an additional tubing attached to the lower end of the vertical cylindrical housing (1).

The tube fitment acts as an in-between sleeve--on its one end, it has adequate design that connects with the spout and valve assembly, and on the other end, it has design features that help connect with the dispensing system. The tube fitment is generally locked in with the dispensing system, and not the spout and valve fitment assembly. The tube fitment-dispensing system assembly (23) (FIG. 12) is jointly connected with the spout and valve assembly as and when needed. Stated another way, once the dispensation of the fluid is completed, the tube fitment is left attached to the dispensing mechanism, and not the spout and valve assembly because once the tube fitment (or the tube fitment-dispensing mechanism assembly) is attached to the spout valve system, the overall assembly would in an open position with the fluid flowing into the dispensing system.

This invention relates to a process for dispensing fluid from a fluid container using the parts described above.

Abbreviations 1 vertical cylindrical housing
2 horizontal channel
3 top cylindrical section or first cylindrical section
4 middle cylindrical section or second cylindrical section
5 lower cylindrical section or third cylindrical section
6 locking groove
7 opening on backside of the vertical housing or cut-away section
8 spout and valve assembly connected to fluid container
9 J-shaped pull tabs
10 partial cylindrical portion that extends above the J-shaped pull tabs
11 horizontal wings
12 cylindrical pin or seal activator pin
15 top ridge of the spout and valve assembly
16 bottom tray
17 vertical walls of the U-shaped bottom tray
21 O-ring
23 dispensing setup
27 locking pin
28 twist knob
29 spout
30 locking hole
100 tube-fitment

The invention claimed is:
1. A tube fitment used in a fitment valve assembly comprising:
   (I) a vertical cylindrical housing having a top section, a middle section, and a lower section, and
   (II) a horizontal cylindrical channel having a bottom portion and a first opening;
   wherein said vertical cylindrical housing being vertically connected to said horizontal cylindrical channel at a point approximately centered thereon thereby forming a joint;

wherein said top section of said vertical cylindrical housing comprises a front wall, a first side wall, a second side wall, and a partially open back wall, wherein said partially open back wall is the locus for connecting and attaching a spout-valve assembly to a container that dispenses fluid;

wherein said horizontal cylindrical channel is defined by the front wall, the first side wall, the second side wall, and the partially open back wall of the top section of the vertical cylindrical housing;

wherein said first opening is defined by the bottom portion of the horizontal cylindrical channel, and is positioned at the joint of the horizontal cylindrical channel and the vertical cylindrical housing, such that said first opening connects the bottom of said top section of said vertical cylindrical housing and the top of said middle section of said vertical cylindrical housing;

wherein at the base of said lower section the said vertical cylindrical housing below said first opening in said horizontal cylindrical channel comprises an activator pin;

wherein an O-ring is situated in said middle section of said vertical cylindrical housing that is narrower than said top section of said vertical cylindrical housing, wherein the partially open back wall of said vertical cylindrical housing includes a tray attached thereto, the tray configured to support said spout-valve assembly attached to the fluid dispensing container.

2. The tube fitment as recited in claim 1, wherein said front wall, on the inside, comprises a locking groove for locking said tube fitment to said spout-valve assembly.

3. The tube fitment as recited in claim 2, wherein said front wall comprises a locking hole above said locking groove and a locking pin positioned therein and a twist knob attached to said locking pin for locking said tube fitment to said spout-valve assembly by turning said twist knob movable between an in and an out position.

4. The tube fitment as recited in claim 3, wherein said top section of said vertical cylindrical housing comprises two J-shaped pull-tabs attached to the two sides of said front wall, such that said vertical cylindrical housing's side walls protrude over the base of said J-shaped pull-tabs.

5. The tube fitment as recited in claim 1, wherein said tray is U-shaped.

6. The tube fitment as recited in claim 1, wherein said activator pin is supported by at least one ridge.

7. The tube fitment as recited in claim 6, wherein said at least one ridge is rectangular.

8. The tube fitment of claim 1, wherein said activator pin is cylindrical.

* * * * *